(12) United States Patent
Iharada et al.

(10) Patent No.: US 10,940,553 B2
(45) Date of Patent: Mar. 9, 2021

(54) SCREW THREAD CUTTER

(71) Applicant: Mitsubishi Hitachi Tool Engineering, Ltd., Tokyo (JP)

(72) Inventors: Yuuki Iharada, Yasu (JP); Mitsuhiro Yokokawa, Yasu (JP)

(73) Assignee: MITSUBISHI HITACHI TOOL ENGINEERING, LTD., Tokyo (JP)

( * ) Notice: Subject to any disclaimer, the term of this patent is extended or adjusted under 35 U.S.C. 154(b) by 271 days.

(21) Appl. No.: 16/064,700

(22) PCT Filed: Jan. 4, 2017

(86) PCT No.: PCT/JP2017/000032
§ 371 (c)(1),
(2) Date: Jun. 21, 2018

(87) PCT Pub. No.: WO2017/122557
PCT Pub. Date: Jul. 20, 2017

(65) Prior Publication Data
US 2019/0009352 A1    Jan. 10, 2019

(30) Foreign Application Priority Data
Jan. 13, 2016   (JP) .............................. JP2016-004701

(51) Int. Cl.
*B23G 5/18*   (2006.01)
*B23C 5/10*   (2006.01)

(52) U.S. Cl.
CPC ................. *B23G 5/18* (2013.01); *B23C 5/10* (2013.01); *B23G 2200/44* (2013.01)

(58) Field of Classification Search
CPC ........ B23G 5/18; B23G 5/06; B23G 2200/28; B23G 2200/44
See application file for complete search history.

(56) References Cited

U.S. PATENT DOCUMENTS

| 1,447,700 A | 3/1923 | Wells |
| 2,512,241 A | 6/1950 | Bradner |

(Continued)

FOREIGN PATENT DOCUMENTS

| CN | 1404426 A | 3/2003 | |
| DE | 1118577 B | * 11/1961 | ............... B23G 5/06 |

(Continued)

OTHER PUBLICATIONS

English translation of DE 1118577, 1961 (Year: 1961).*

(Continued)

*Primary Examiner* — Alan Snyder
(74) *Attorney, Agent, or Firm* — Locke Lord LLP (57) ABSTRACT

In a screw thread cutter, a screw thread-cutting edge is formed on an outer periphery of a tip portion of a cutter body. Finishing edge-thread ridge height from a tangent line passing through valley bottoms of second and third valley portions to outer peripheral ends of first and second finishing edges are equal to each other. A preceding edge-thread ridge height from the tangent line to an outer peripheral end of a preceding edge is lower than each of the finishing edge-thread ridge height. A first valley portion-depth from the outer peripheral end of the first finishing edge to the valley bottom of the first valley portion is deeper than a second valley portion-depth from the outer peripheral end of the second finishing edge to the valley bottom of the second valley portion.

17 Claims, 5 Drawing Sheets

(56) References Cited

U.S. PATENT DOCUMENTS

| | | | |
|---|---|---|---|
| 4,423,893 A | 1/1984 | Holmes | |
| 5,316,520 A | 5/1994 | Green | |
| 6,213,693 B1 * | 4/2001 | Kato | .................. B23G 5/06 408/215 |
| 2010/0329806 A1 | 12/2010 | Ellis | |
| 2012/0093592 A1 | 4/2012 | Durst | |
| 2014/0301796 A1 | 10/2014 | Glimpel et al. | |

FOREIGN PATENT DOCUMENTS

| | | |
|---|---|---|
| DE | 2852906 A1 | 6/1980 |
| DE | 10162430 A1 | 7/2003 |
| DE | 102009029715 A1 | 12/2010 |
| EP | 0145167 A1 | 6/1985 |
| EP | 04038070 A2 | 7/1991 |
| GB | 1584771 A | 2/1981 |
| JP | 09/225743 A | 9/1997 |
| JP | 2001-018120 A | 1/2001 |
| JP | 2003535706 A | 12/2003 |
| JP | 2005-271092 A | 10/2005 |
| JP | 2009101485 A | 5/2009 |
| JP | 4526048 B2 | 8/2010 |
| JP | 2012035351 A | 2/2012 |
| JP | 2012-86286 A | 5/2012 |
| JP | 5788579 B1 | 9/2015 |
| SU | 1168363 A1 * | 7/1985 ............. B23F 21/16 |

OTHER PUBLICATIONS

Supplementary European Search Report dated Sep. 11, 2019, issued for the European patent application No. 17738312.2.

Office Action dated Mar. 11, 2019, issued for the Chinese patent application No. 201780005005.5 and a partial English translation of the search report.

International Search Report dated Mar. 28, 2017, issued for PCT/JP2017/000032 and English translation thereof.

Japanese Office Action dated Dec. 15, 2020 for corresponding Japanese Application No. 2017-561589.

* cited by examiner

SCREW THREAD CUTTER

TECHNICAL FIELD

The present invention relates to a screw thread cutter in which at least three screw thread-cutting edges protruding toward an outer peripheral side of a cutter body rotated around an axis are formed on an outer periphery of a tip portion of the cutter body to be arranged in an axial direction.

Priority is claimed on Japanese Patent Application No. 2016-004701, filed on Jan. 13, 2016, the content of which is incorporated herein by reference.

BACKGROUND ART

For example, Patent Document 1 discloses a screw thread cutter which includes screw thread-cutting edges having a plurality of thread ridges on an outer periphery of a cutter body. Among the plurality of screw thread-cutting edges, at least one screw thread-cutting edge positioned on a tip side of the cutter body is a preceding edge which performs rough cutting. Other screw thread-cutting edges are finishing edges. A thread ridge height of the preceding edge is lower than that of each of the finishing edges, a thread ridge angle of the preceding edge is smaller than that of each of the finishing edge. The preceding edge is included in the finishing edges when the preceding edge graphically overlaps the finishing edges based on a valley bottom. In addition, a bottom of the cutter body is provided with an end cutting edge for forming a prepared hole in a workpiece.

The screw thread cutter is attached to a machine tool such as a machining center or an NC milling machine or the like, is rotationally driven around an axis of the cutter body so as to be rotated, is helically fed relative to the workpiece, and forms a female screw portion on an inner peripheral surface of the prepared hole by the screw thread-cutting edges while forming the prepared hole in the workpiece by the end cutting edge. When the female screw portion is formed, the finishing edge finishes screw grooves which are roughly cut by the preceding edge, and thus, even when thread cutting is performed on a workpiece formed of a high hardness material, cutting edge abrasion of the finishing edge is suppressed and a cutting resistance is reduced.

CITATION LIST

Patent Literature

[Patent Document 1] Japanese Unexamined Patent Application, First Publication No. 2012-086286

SUMMARY OF INVENTION

Technical Problem

Meanwhile, in the screw thread cutter disclosed in Patent Document 1, two finishing edges are provided on a posterior end side of the preceding edge in the axial direction. However, the preceding edge and a tip side finishing edge adjacent to the preceding edge are mainly used for the thread cutting. A posterior end-side finishing edge is used to prevent a predetermined screw groove shape from being not obtained due to the cutting edge abrasion of the tip side finishing edge. Accordingly, the two finishing edges are formed so that heights and shapes of the thread ridges are equal to each other and heights and shapes of valley portions are equal to each other.

However, in the screw thread cutter, the valley portion between the tip side finishing edge and the preceding edge which cut an apex of the screw head in the female screw portion of the workpiece form the apex by one cutting. Accordingly, a cutting load on the valley portion between the tip side finishing edge and the preceding edge excessively increases with respect to the apex of the thread ridge of the tip side finishing edge which cuts the valley portion of the female screw portion by cutting along with the preceding edge twice. Particularly, in a case where the thread cutting is performed on the workpiece formed of a high hardness material, the excessive cutting load shockingly acts, and thus, there is a concern that damage occurs in the finishing edge from the valley portion which is a root portion of the finishing edge.

The present invention is made in consideration of the above-described circumstance, and an object thereof is to provide a screw thread cutter capable of preventing the finishing edge from being damaged or the like even when the thread cutting is performed on the workpiece formed of a high hardness material while inhibiting an excessive cutting load from acting on the valley portion between the tip side finishing edge and the preceding edge which cut the apex of the thread ridge of the female screw portion.

Solution to Problem

In order to solve the problems and achieve the object, according to a first aspect of the present invention, there is provided a screw thread cutter, in which at least three screw thread-cutting edges which protrude toward an outer peripheral side of a cutter body rotated around an axis are formed on an outer periphery of a tip portion of the cutter body to be arranged in an axial direction. Among the plurality of screw thread-cutting edges, the screw thread-cutting edge positioned on a tip side in the axial direction is a preceding edge. Among the plurality of screw thread-cutting edges, the screw thread-cutting edge positioned on a posterior end side in the axial direction with respect to the preceding edge is a first finishing edge. Among the plurality of screw thread-cutting edges, the screw thread-cutting edge positioned on a posterior end side in the axial direction with respect to the first finishing edge is a second finishing edge. A first valley portion which is recessed toward an inner peripheral side of the cutter body is formed between the preceding edge and the first finishing edge. A second valley portion which is recessed toward the inner peripheral side of the cutter body is formed between the first finishing edge and the second finishing edge. A third valley portion which is recessed toward the inner peripheral side of the cutter body is formed on a posterior end side in the axial direction with respect to of the second finishing edge. Finishing edge-thread ridge heights in a radial direction with respect to the axis from a tangent line passing through valley bottoms of the second and third valley portions to outer peripheral ends of the first and second finishing edges are equal to each other. A preceding edge-thread ridge height in the radial direction with respect to the axis from the tangent line passing through the valley bottoms of the second and third valley portions to an outer peripheral end of the preceding edge is lower than the finishing edge-thread ridge heights. A first valley portion-depth in the radial direction with respect to the axis from the outer peripheral end of the first finishing edge to the valley bottom of the first valley portion is deeper than a second valley portion-depth in the radial direction with respect to the axis from the outer peripheral end of the second finishing edge to the valley bottom of the second valley portion.

In the screw thread cutter having the above-described configuration, the thread ridge height of the preceding edge on the tip side in the axial direction is lower than the thread ridge height of each of the first and second finishing edges on the posterior end side. Thus, similarly to the screw thread cutter disclosed in Patent Document 1, after the valley portion of the female screw portion of the workpiece is roughly cut by the preceding edge, the valley portion of the female screw portion roughly cut can be finishing-cut by only the first finishing edge so as to be formed in a predetermined screw groove shape.

Moreover, in the screw thread cutter having the above-described configuration, the first valley portion-depth from the outer peripheral end of the first finishing edge to the valley bottom of the first valley portion is deeper than the second valley portion-depth from the outer peripheral end of the second finishing edge to the valley bottom of the second valley portion. Thus, after an apex of the thread ridge of the female screw portion is roughly cut by the first valley portion, the apex can be finishing-cut by the second valley portion so as to be formed in a predetermined screw groove shape. Accordingly, a cutting load when the apex of the thread ridge of the female screw portion is cut is dispersed to the first and second valley portions, it is possible to inhibit an excessive cutting load from being concentrated in the first valley portion. Therefore, even when thread cutting is performed on a workpiece formed of a high hardness material, it is possible to prevent the finishing edge from being damaged or the like.

Here, preferably, a ratio between the first valley portion-depth and the second valley portion-depth is within a range of 1.03 to 1.15. If a difference between the first and second valley portion-depths decreases as the ratio falls below 1.03, there is a concern that it is not possible to sufficiently reduce the cutting load to the first valley portion. Conversely, if the difference between the first and second valley portion-depths increases as the ratio exceeds 1.15, there is a concern that the cutting load to the second valley portion increases, damage occurs in the second finishing edge, or the like.

In addition, for example, in order to cause the first valley portion-depth to be deeper than the second valley portion-depth, it is considered that an interval in the axial direction from the valley bottom of the first valley portion to the outer peripheral end of the first finishing edge is made to be equal to an interval in the axial direction from the valley bottom of the second valley portion to the outer peripheral end of the second finishing edge so as to increase an inclined angle of the cutting edge facing the tip side in the axial direction of the first finishing edge with respect to the axis. Meanwhile, in this case, the cutting edge of the second finishing edge which faces the tip side in the axial direction is used for the cutting from the second valley portion to the vicinity of the outer peripheral end. Thus, there is a concern that a predetermined screw groove cannot be obtained when the first finishing edge is abraded, and there is a concern that a root portion of the first finishing edge is thinned and damages of the first finishing edge cannot be sufficiently prevented.

Accordingly, like the present invention, in order to cause the first valley portion-depth to be deeper than the second valley portion-depth, it is preferably that the interval in the axial direction from the valley bottom of the first valley portion to the outer peripheral end of the first finishing edge is larger than the interval in the axial direction from the valley bottom of the second valley portion to the outer peripheral end of the second finishing edge. According to this configuration, it is not necessary to increase the inclined angle of the cutting edge of the first finishing edge facing the tip side in the axial direction with respect to the axis. Thus, a thickness of the root portion of the first finishing edge is secured, and it is possible to more reliably prevent the damages or the like. In addition, it is preferable that a ratio between the interval in the axial direction from the valley bottom of the first valley portion to the outer peripheral end of the first finishing edge and the interval in the axial direction from the valley bottom of the second valley portion to the outer peripheral end of the second finishing edge is within a range of 1.01 to 1.09.

In addition, particularly, in a case of this configuration, when the second finishing edge is moved parallel to the tangent line toward the tip side in the axial direction by an interval between the outer peripheral ends of the first finishing edges and the outer peripheral ends of the second finishing edges in a direction of the tangent line passing through the valley bottoms of the second and third valley portions, the first and second finishing edges can be formed such that a rotation locus of the second finishing edge around the axis overlaps with a rotation locus of the first finishing edge around the axis except for the first and second valley portions. In other words, when the second finishing edge is moved toward the tip side in the axial direction to be parallel to the tangent line passing through the valley bottoms of the second and third valley portions (in a case where a movement distance of the second finishing edge in the axial direction is set to the interval) by an interval of each of the outer peripheral ends of the first and second finishing edges in the axial direction, the first and second finishing edges can be formed such that the rotation locus of the second finishing edge around the axis overlaps with the rotation locus of the first finishing edge around the axis except for the first and second valley portions. Accordingly, before the first finishing edge is abraded, the cutting edge of the second finishing edge on the posterior end side of the second valley portion in the axial direction facing the tip side in the axial direction is not used for the cutting. Therefore, even when the first finishing edge is abraded, it is possible to form a predetermined screw groove shape by the second finishing edge.

In addition, it is preferable that when a rotation locus of the preceding edge around the axis is moved toward the posterior end side in the axial direction to be parallel to the tangent line passing through the valley bottoms of the second and third valley portions by an interval between the outer peripheral end of the first finishing edge and the outer peripheral end of the second finishing edge in a direction of the tangent line, the rotation locus of the preceding edge is included in the rotation locus of the first finishing edge around the axis. In other words, it is preferable that when the rotation locus of the preceding edge around the axis is moved toward the posterior end side in the axial direction to be parallel to the tangent line passing through the valley bottoms of the second and third valley portions (in a case where a movement distance of the rotation locus of the preceding edge in the axial direction is set to the interval) by the interval of each of the outer peripheral ends of the first and second finishing edges in the axial direction, the rotation locus of the preceding edge is formed to be included in the rotation locus of the first finishing edge around the axis. Accordingly, for example, even when the tip portion of the cutter body is deflected by an excessive cutting load, it is possible to inhibit a thread cutting surface of the female screw portion from being scratched by the preceding edge.

In addition, it is preferable that each of the first and second finishing edges includes a cutting edge facing the tip side in the axial direction, a cutting edge facing the posterior end side in the axial direction, and a linear outer peripheral cutting edge, and in each of the first and second finishing edges, the outer peripheral cutting edge and the cutting edge facing the tip side in the axial direction are connected to each other via a plurality of linear cutting edges, and the cutting edge facing the posterior end side in the axial direction and the outer peripheral cutting edge are connected to each other via a plurality of linear cutting edges. Accordingly, for example, like a pipe female screw, in a case where a female screw having the apex of the thread ridge and a corner of the valley portion which are curved is machined, by helically feeding the screw thread cutter having the above configuration relative to the workpiece, the loci of the cutting edges of the first and second finishing edges draw continuous curves. As a result, it is possible to form a machined surface equivalent to a case where the cutting is performed by the finishing edge formed in a curve.

Moreover, it is preferable that the outer peripheral end of the second finishing edge is positioned outside the outer peripheral end of the first finishing edge in the radial direction with respect to the axis. As a result, it is possible to accurately perform a tapered thread machining such as a pipe screw.

In addition, according to a second aspect of the present invention, there is provided a screw thread cutter, in which at least three screw thread-cutting edges which protrude toward an outer peripheral side of a cutter body rotated around an axis are formed on an outer periphery of a tip portion of the cutter body to be arranged in an axial direction. Among the plurality of screw thread-cutting edges, the screw thread-cutting edge positioned on a tip side in the axial direction is a preceding edge. Among the plurality of screw thread-cutting edges, the screw thread-cutting edge positioned on a posterior end side in the axial direction with respect to the preceding edge is a first finishing edge. Among the plurality of screw thread-cutting edges, the screw thread-cutting edge positioned on a posterior end side in the axial direction with respect to the first finishing edge is a second finishing edge. A first valley portion which is recessed toward an inner peripheral side of the cutter body is formed between the preceding edge and the first finishing edge. A second valley portion which is recessed toward the inner peripheral side of the cutter body is formed between the first finishing edge and the second finishing edge. A third valley portion which is recessed toward the inner peripheral side of the cutter body is formed on a posterior end side in the axial direction with respect to of the second finishing edge. An outer peripheral end of the second finishing edge is positioned outside an outer peripheral end of the first finishing edge in a radial direction with respect to the axis. A preceding edge-thread ridge height in the radial direction with respect to the axis from a tangent line passing through valley bottoms of the second and third valley portions to an outer peripheral end of the preceding edge is lower than finishing edge-thread ridge heights in the radial direction from the tangent line to the outer peripheral ends of the first and second finishing edges. A first valley portion-depth in the radial direction with respect to the axis from the outer peripheral end of the first finishing edge to the valley bottom of the first valley portion is deeper than a second valley portion-depth in the radial direction with respect to the axis from the outer peripheral end of the second finishing edge to the valley bottom of the second valley portion.

Similarly to the screw thread cutter of the above-described first aspect, in the screw thread cutter having the second aspect configured as described above, it is possible to inhibit an excessive cutting load from acting on the first valley portion. The screw thread cutter according to the second aspect may have the above-described preferable configurations in the first aspect. In the first and second aspects, an outer peripheral cutting edge of each of the first and second finishing edges may have a convex arc shape. In addition, each of the first and second valley portions may have a concave arc shape.

Advantageous Effects of Invention

As described above, according to the present invention, the cutting load when the apex of the thread ridge of the female screw portion is cut is dispersed to the first and second valley portions, it is possible to inhibit an excessive cutting load from acting on the first valley portion. Therefore, even when thread cutting is performed on a workpiece formed of a high hardness material, it is possible to prevent the finishing edge from being damaged or the like and perform stable thread cutting over a long period of time.

DESCRIPTION OF EMBODIMENTS

First Embodiment

FIGS. 1 to 4 show an embodiment (first embodiment) of the present invention. In a screw thread cutter of the present embodiment, a cutter body 1 is formed of a hard material such as cemented carbide or the like and has a multi-step columnar shape about an axis O. A posterior end-side (right side in FIGS. 1, 2, and 4) portion of the cutter body 1 is a shank portion 2 which remains as a columnar shape, a tip side (left side in FIGS. 1, 2, and 4) portion is a cutting edge portion 3, and a portion between the shank portion 2 and the cutting edge portion 3 is a neck portion 4 having an outer diameter smaller than those of the shank portion 2 and the cutting edge portion 3. Moreover, in the present specification, in the cutter body 1, a region in which a screw thread-cutting edge 8 described later is formed is referred to as a cutting edge portion 3.

In the screw thread cutter, the shank portion 2 is attached to be held to a spindle of a machine tool such as a machining center or an NC milling machine or the like, is rotationally driven around the axis O so as to be rotated in a cutter rotation direction T, is spirally driven rotationally around the axis to be parallel to the axis O relative to a workpiece so as to be helically fed, and forms a female screw portion in the workpiece by the cutting edge portion 3.

In addition, in the present specification, a direction in which the axis O extends is referred to as a direction of the axis O. In the direction of the axis O, a direction from the shank portion 2 toward the cutting edge portion 3 is referred to as a tip side (left side in FIG. 1), and a direction from the cutting edge portion 3 toward the shank portion 2 is referred to as a posterior end side (right side in FIG. 1). In addition, a direction orthogonal to the axis O is referred to as a radial direction. In the radial direction, a direction which approaches the axis O is referred to as an inner peripheral side (radially inner side) and a direction which is separated from the axis O is referred to as an outer peripheral side (radially outer side). In addition, a direction around the axis O is referred to as a circumferential direction. In the circumferential direction, a direction in which the cutter body 1 is rotated is referred to as the cutter rotation direction T, and a direction opposite to the cutter rotation direction T is referred to as a side opposite to the cutter rotation direction T.

A plurality of chip discharge grooves 5 which are open to a tip surface of the cutting edge portion 3, extend to be approximately parallel to the axis O, and have an L-shaped cross section (formed in an approximately L shape in a cross section orthogonal to the axis O) are formed on outer peripheries of tip portions of the cutting edge portion 3 and the neck portion 4 at intervals in the circumferential direction. In the present embodiment, four chip discharge grooves 5 are formed at equal intervals in the circumferential direction. A wall surface 5a of each chip discharge groove 5 facing the cutter rotation direction T is parallel to the axis O and extends slightly toward the side opposite to the cutter rotation direction T toward the outer peripheral side of the cutter body 1. That is, the wall surface 5a facing the cutter rotation direction T is a concave surface which extends from the tip surface of the cutting edge portion 3 toward the posterior end side and is parallel to the axis O. A wall surface of the chip discharge groove 5 facing the side opposite to the cutter rotation direction T rises up to the outer peripheral side on the tip portion of the neck portion 4 and forms a termination of the chip discharge groove 5. That is, the wall surface of the chip discharge groove 5 facing the side opposite to the cutter rotation direction T extends toward the outer peripheral side from the tip surface of the cutting edge portion 3 toward the posterior end side in the direction of the axis O and reaches an outer peripheral surface of the neck portion 4.

Figure 1:
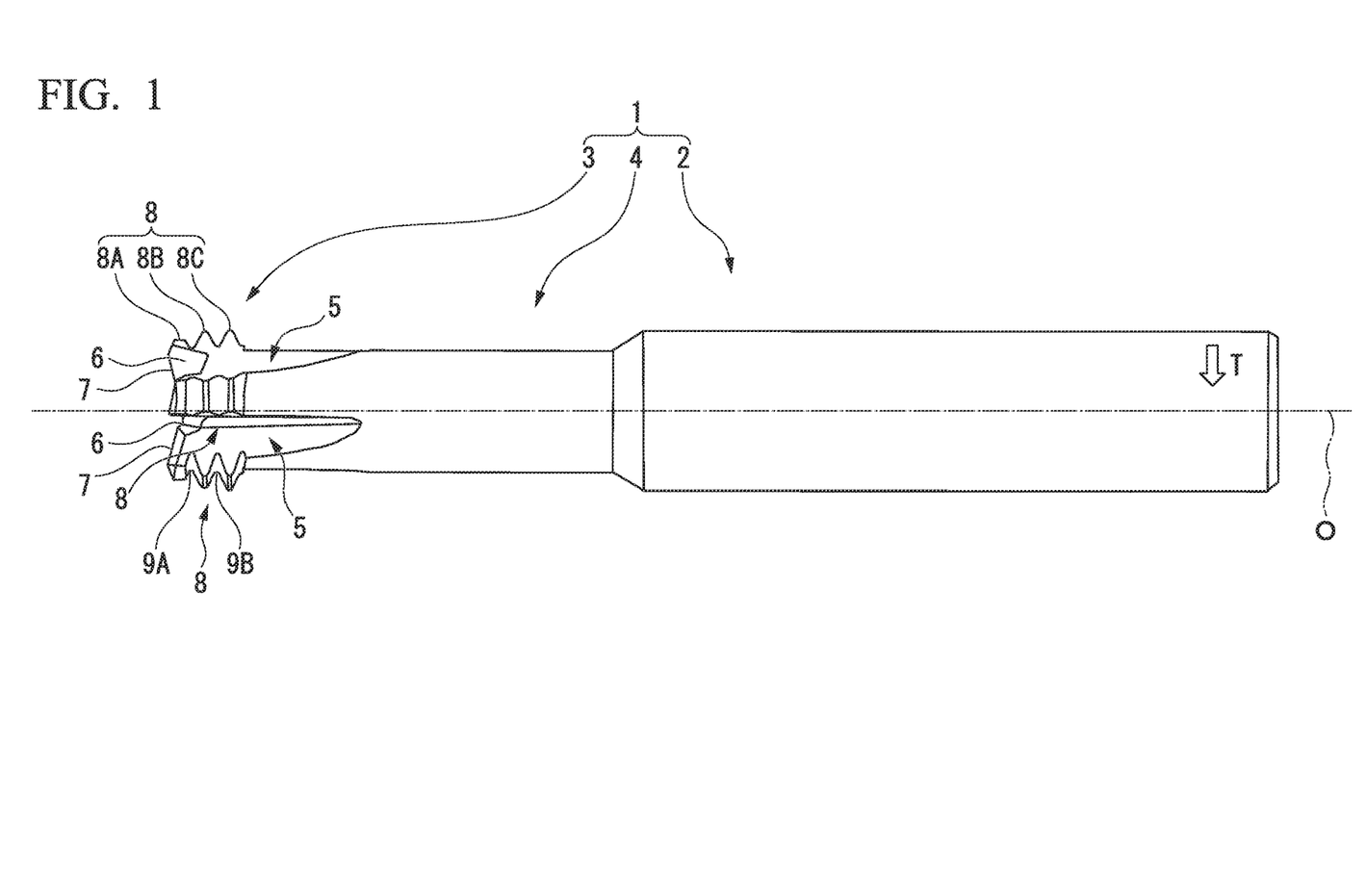
FIG. 1 a side view showing a first embodiment of the present invention.
Figure 2:
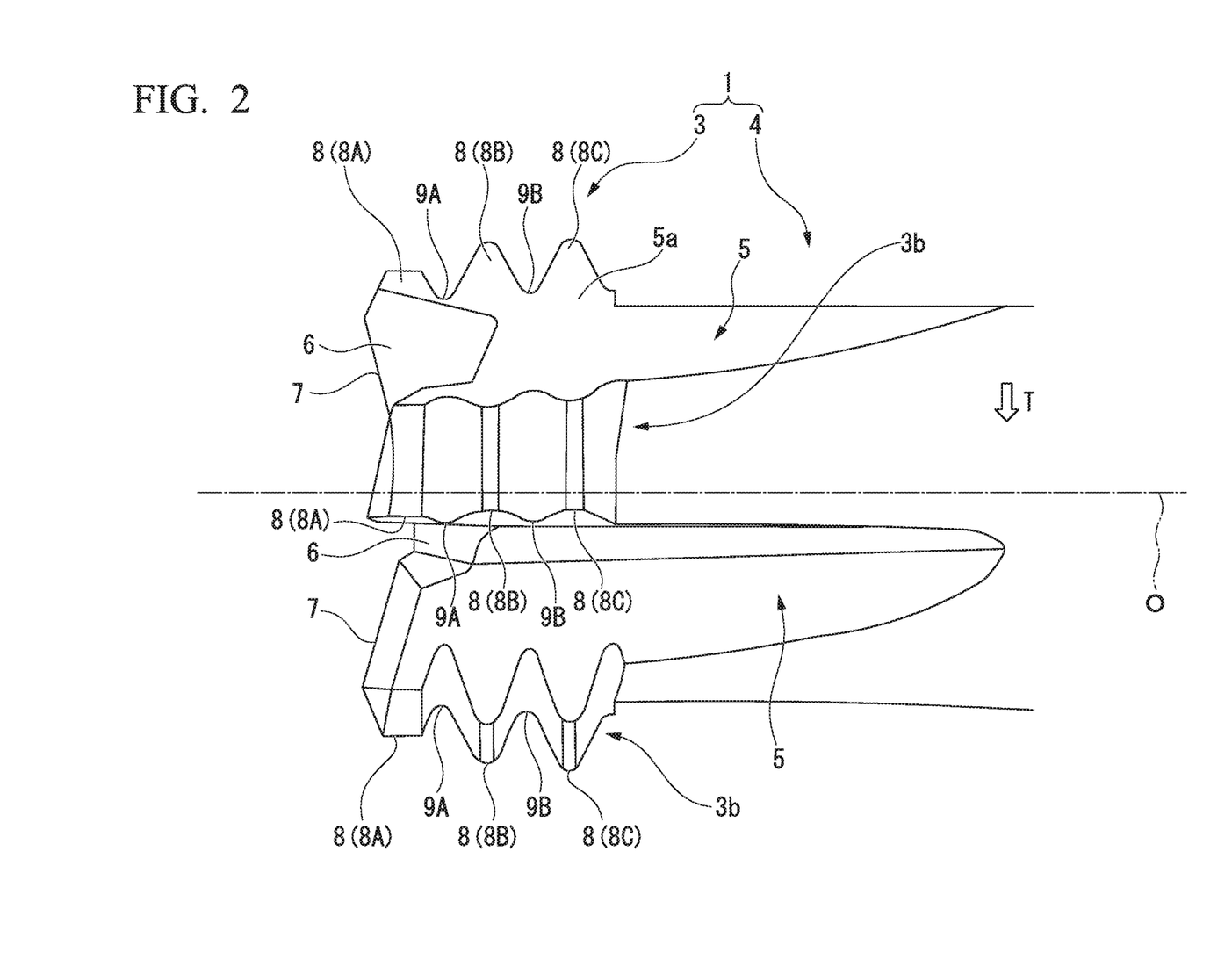
FIG. 2 is an enlarged side view of a tip portion of a cutter body of the embodiment shown in FIG. 1.
Figure 3:
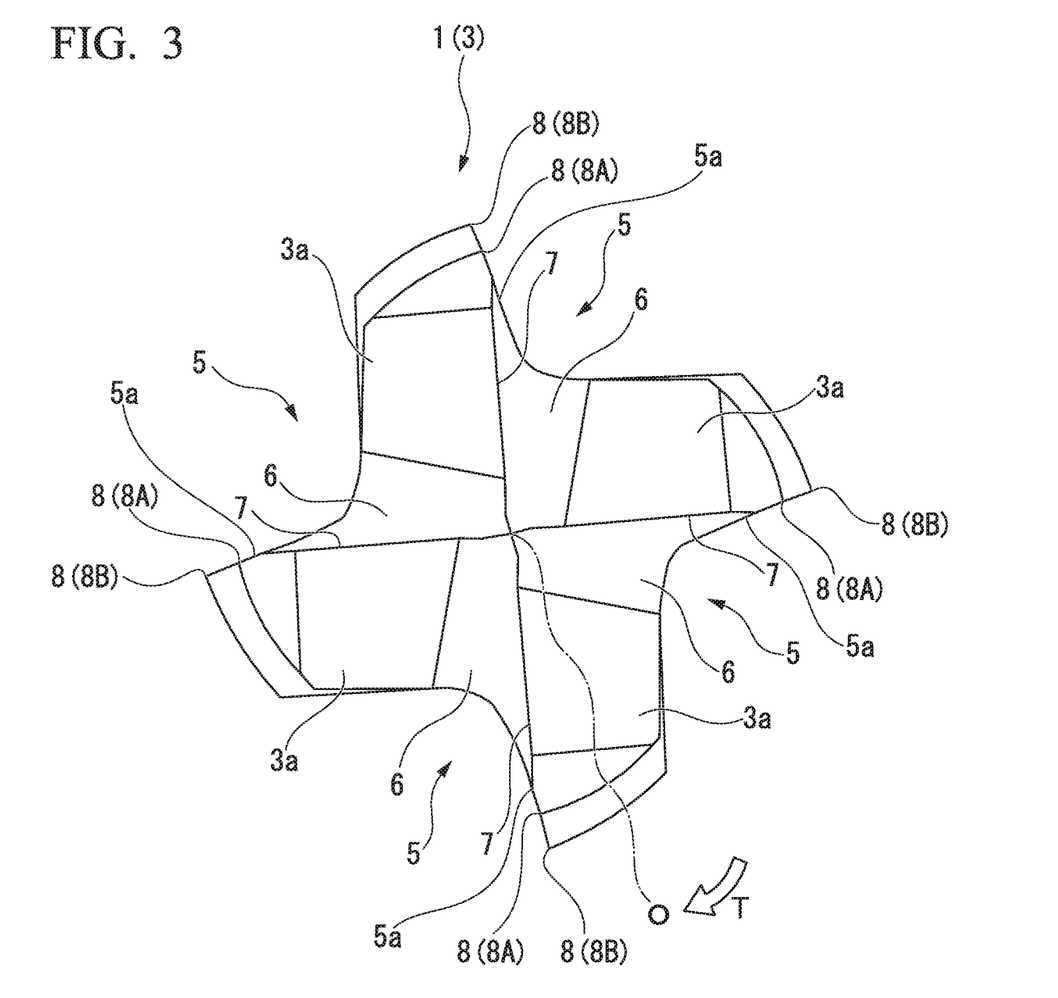
FIG. 3 is an enlarged front view of the cutter body of the embodiment shown in FIG. 1.

In addition, a groove 6 having a substantially trapezoidal cross section which extends to the tip side from the tip end-inner peripheral portion of each chip discharge groove 5 toward the inner peripheral side and reaches the axis O is formed on the tip surface of the cutting edge portion 3. The tip end-inner peripheral portion of the wall surface 5a of the chip discharge groove 5 facing the cutter rotation direction T is slightly notched toward the side opposite to the cutter rotation direction T by the groove 6. In other words, as shown in FIG. 3, the groove 6 has a groove bottom facing the tip side in the direction of the axis O and the wall surface facing the cutter rotation direction T extends along the radial direction. An outer peripheral side end of the groove 6 is continuous to the tip end-inner peripheral portion of the chip discharge groove 5. A depth of the groove 6 decreases and a groove width of the groove 6 is narrowed from the outer peripheral end of the groove 6 toward the inner peripheral side. Wall surfaces of the grooves 6 facing the cutter rotation direction T intersect each other about the axis O. In the present embodiment, four grooves 6 are provided in the circumferential direction at equal intervals, and the tip surface of the cutting edge portion 3 is divided into four regions rotationally symmetrical about the axis O.

In addition, an inner peripheral portion 3a (refer to FIG. 3) of the tip surface of the cutting edge portion 3 remaining between the chip discharge grooves 5 adjacent to each other in the circumferential direction and between the grooves 6 adjacent to each other in the circumferential direction is slightly inclined toward the posterior end side in the direction of the axis O toward the inner peripheral side and the side opposite to the cutter rotation direction T. An end cutting edge 7 is formed on an intersection ridgeline portion between the inner peripheral portion 3a of the tip surface of the inclined cutting edge portion 3 and the wall surface of the groove 6 facing the cutter rotation direction T.

In addition, a plurality of thread ridges which are uneven to the inner peripheral side and the outer peripheral side of the cutter body 1 in the direction of the axis O are formed in each of the outer peripheral portions 3b (outer peripheries of the tip portion of the cutter body 1) of the cutting edge portion 3 remaining between the chip discharge grooves 5 adjacent to each other. At least three screw thread-cutting edges 8 protruding toward the outer peripheral side of the cutter body 1 are formed on an intersection ridgeline portion between the thread ridge and the wall surface 5a of the chip discharge groove 5 facing the cutter rotation direction T. In the present embodiment, three screw thread-cutting edges 8 are formed in each outer peripheral portion 3b of the cutting edge portion 3 between the chip discharge grooves 5. The screw thread-cutting edge 8 includes a preceding edge 8A, a first finishing edge 8B, and a second finishing edge 8C in this order from the tip side. The screw thread-cutting edge 8 is shifted in phase between the outer peripheral portions 3b so as to follow a lead of a helix (a helix drawn by the cutter body 1 during helical feeding) when the cutter body 1 is helically fed toward the side opposite to the cutter rotation direction T.

Figure 4:
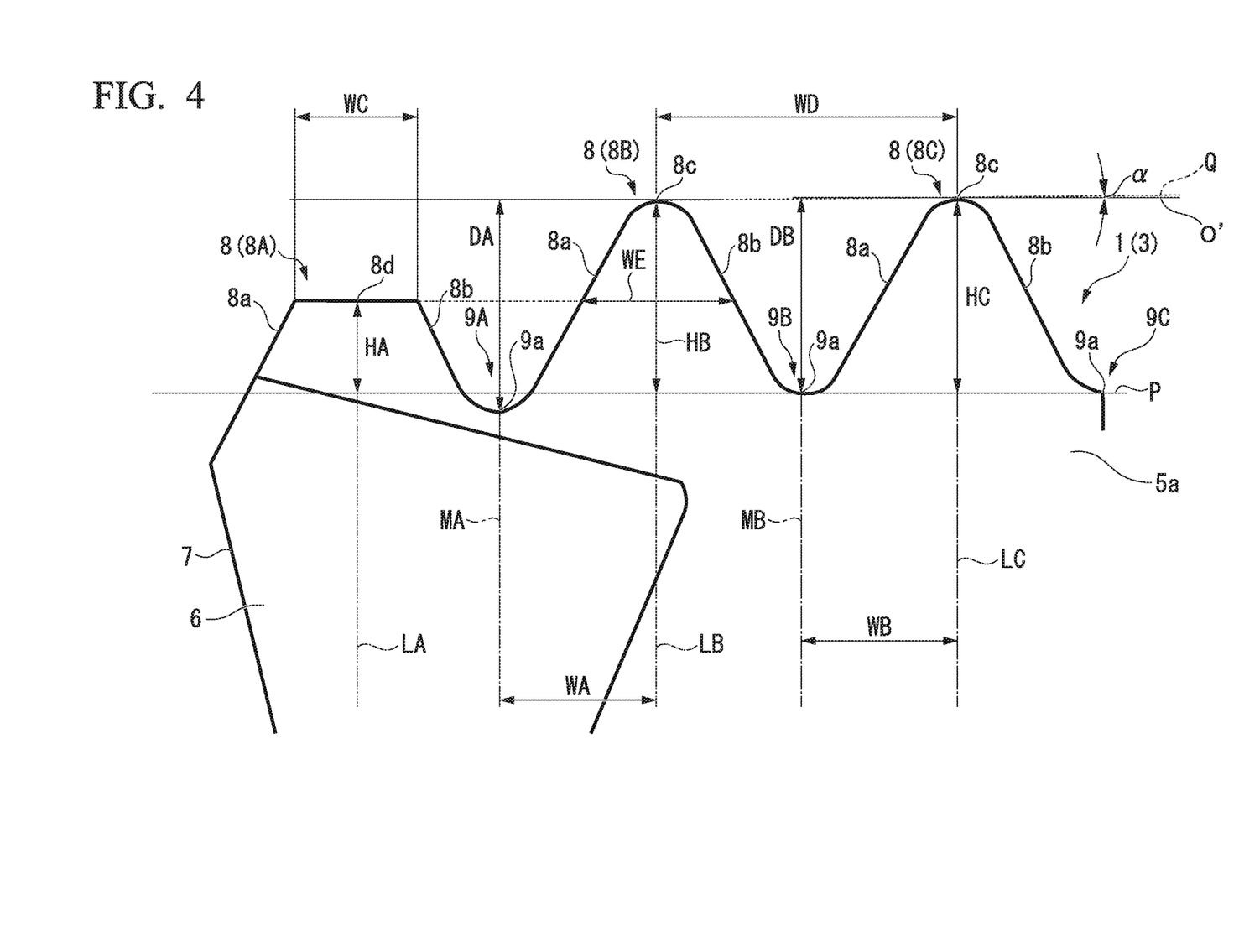
FIG. 4 is a partially enlarged side view showing a screw thread-cutting edge of the embodiment shown in FIG. 1.

As shown in FIG. 4, each of the first and second finishing edges 8B and 8C includes a cutting edge 8a facing the tip side in the direction of the axis O, a cutting edge 8b facing the posterior end side in the direction of the axis O, and an outer peripheral cutting edge (outer peripheral end) 8c which connects radially outer ends of the two cutting edges 8a and 8b. The cutting edge 8a and the cutting edge 8b are formed so as to approach each other toward the outer peripheral side with the same constant angle with respect to thread ridge center lines LB and LC which are perpendicular to the axis O and pass through the outer peripheral ends (vertexes) 8c of the first and second finishing edges 8B and 8C. Each of the cutting edge 8a and the cutting edge 8b is formed in a straight line shape. In the present embodiment, the outer peripheral ends (outer peripheral cutting edges) 8c of the first and second finishing edges 8B and 8C are formed in convex arc shapes which are in contact with both cutting edges 8a and 8b and have the same radius as each other. The outer peripheral cutting edge 8c of the first finishing edge 8B is an arc having a point on the thread ridge center line LB as a center, and the outer peripheral cutting edge 8c of the second finishing edge 8C is an arc having a point on the thread ridge center line LC as a center. Each of the first and second finishing edges 8B and 8C is approximately linearly symmetrical with respect to each of the thread ridge center lines LB and LC.

Meanwhile, the preceding edge 8A is formed in a trapezoidal shape, and includes a cutting edge 8a facing the tip side in the direction of the axis O and a cutting edge 8b facing the posterior end side in the direction of the axis O which approach each other toward the outer peripheral side with approximately the same constant angle with respect to a thread ridge center line LA, and an outer peripheral cutting edge 8d which intersects the cutting edges 8a and 8b with an obtuse angle on an outer periphery of the preceding edge 8A and extends to be parallel to the axis O. That is, each of the cutting edges 8a and 8b and the outer peripheral cutting edge 8d are formed in a straight line shape and the preceding edge 8A is approximately linearly symmetrical with respect to the thread ridge center line LA. In the tip of the cutting edge portion 3, the cutting edge 8a facing the tip side in the direction of the axis O of the preceding edge 8A intersects with the end cutting edge 7 at a portion of the tip end-inner peripheral portion of the wall surface 5a of the chip discharge groove 5 facing the cutter rotation direction T which is notched by the groove 6. In other words, in the tip end of the groove 6, the cutting edge 8a of the preceding edge 8A intersects the end cutting edge 7. In addition, the thread ridge center line LA of the preceding edge 8A is perpendicular to the axis O and passes through the center of the outer peripheral cutting edge 8d, and the thread ridge center line LA of the preceding edge 8A and the thread ridge center lines LB and LC of the first and second finishing edges 8B and 8C are disposed at approximately equal intervals in the direction of the axis O.

In addition, a first valley portion 9A is provided between the preceding edge 8A and the first finishing edge 8B and is formed to be recessed toward the inner peripheral side of the cutter body 1 with respect to the preceding edge 8A and the first finishing edge 8B. A second valley portion 9B is provided between the first and second finishing edge 8B and 8C and is formed to be recessed toward the inner peripheral side of the cutter body 1 with respect to the first finishing edge 8B and the second finishing edge 8C. A third valley portion 9C is provided on the posterior end side of the second finishing edge 8C in the direction of the axis O and is formed to be recessed toward the inner peripheral side of the cutter body 1 with respect to the second finishing edge 8C. In the present embodiment, each of the first and second valley portions 9A and 9B is formed in an approximately ½ recessed arc shape which is in contact with the cutting edge 8b facing the posterior end side of each of the preceding edge 8A and the first finishing edge 8B in the direction of the axis O and the cutting edge 8a facing the tip side of each of the first and second finishing edges 8B and 8C in the direction of the axis O. In other words, the first valley portion 9A is smoothly continued to the cutting edge 8b facing the posterior end side of the preceding edge 8A in the direction of the axis O and the cutting edge 8a facing the tip side of the first finishing edge 8B in the direction of the axis O, and is formed in a concave arc having a point on a first valley portion center line MA which is perpendicular to the axis O and passes through a valley bottom 9a of the first valley portion 9A as a center. The second valley portion 9B is smoothly continued to the cutting edge 8b facing the posterior end side of the first finishing edge 8B in the direction of the axis O and the cutting edge 8a facing the tip side of the second finishing edge 8C in the direction of the axis O, and is formed in a concave arc having a point on a second valley portion center line MB which is perpendicular to the axis O and passes through a valley bottom 9a of the second valley portion 9B as a center. The radius of each of the first and second valley portions 9A and 9B is approximately the same as that of the convex arc formed by the outer peripheral end (outer peripheral cutting edge) 8c of each of the first and second finishing edges 8B and 8C. In addition, the third valley portion 9C is formed in an approximately quarter-concave arc shape having a radius approximately equal to the concave arc formed by the first and second valley portions 9A and 9B. The third valley portion 9C is smoothly continued to the cutting edge 8b of the second finishing edge 8C facing the posterior end side in the direction of the axis O.

In addition, a preceding edge-thread ridge height HA of the preceding edge 8A from a tangent line P passing through the valley bottoms 9a of the second and third valley portions 9B and 9C to an outer peripheral cutting edge 8d along the thread ridge center line LA is lower than finishing edge-thread ridge height HB and HC of the first and second finishing edges 8B and 8C. Here, the tangent line P is a straight line passing through the valley bottoms 9a of the second and third valley portions 9B and 9C. Each of the valley bottoms 9a is a point of each of the second and third valley portions 9B and 9C closest to the axis O. The finishing edge-thread ridge height HB is a radial distance between the outer peripheral end (is a vertex of the first finishing edge 8B and a point farthest from the axis O) of the first finishing edge 8B and the tangent line P. The finishing edge-thread ridge height HC is a radial distance between the outer peripheral end (is a vertex of the second finishing edge 8C and a point farthest from the axis O) of the second finishing edge 8C and the tangent line P.

In addition, in the present embodiment, the outer peripheral end (vertex) 8c of the second finishing edge 8C is positioned outside the outer peripheral end (vertex) 8c of the first finishing edge 8B in the radial direction. Specifically, a straight line Q passing through the outer peripheral end (vertex) 8c of the first finishing edge 8B and the outer peripheral end (vertex) 8c of the second finishing edge 8C is inclined to the outer peripheral side toward the posterior end side in the direction of the axis O, and as shown in FIG. 4, an angle α between a straight line O' parallel to the axis O and the straight line Q is more than 0° and equal to or less than 5.0°. As a result, it is possible to accurately perform a tapered thread machining such as a pipe screw. In addition, as described below, the finishing edge-thread ridge height HB and HC of the first and second finishing edges 8B and 8C are the same as each other, and an angle between the tangent line P and the axis O (straight line O') is the same as the angle α and is set to be more than 0° and equal to or less than 5.0°.

In addition, in the present embodiment, an inclined angle between the cutting edges 8a and 8b of the preceding edge 8A and the thread ridge center line LA is approximately the same as an inclined angle between the cutting edges 8a and 8b of each of the first and second finishing edges 8B and 8C and each of the thread ridge center lines LB and LC. An interval (a width of the outer peripheral cutting edge 8d in the direction of the axis O) WC between the cutting edges 8a and 8b of the preceding edge 8A at a position (radial position) of the outer peripheral cutting edge 8d of the preceding edge 8A is smaller than an interval WE between the cutting edges 8a and 8b of the first finishing edge 8B at a position at which the preceding edge 8A is moved to the posterior end side in the direction of the axis O to be parallel to the tangent line P passing through the valley bottoms 9a of the second and third valley portions 9B and 9C by an interval (a distance between the thread ridge center lines LB and LC) WD in the direction of the tangent line P of the outer peripheral ends (vertexes) 8c of the first and second finishing edges 8B and 8C.

Moreover, as shown in FIG. 4, a first valley portion-depth DA in the radial direction with respect to the axis O from the outer peripheral end (vertex) 8c of the first finishing edge 8B to the valley bottom 9a of the first valley portion 9A is deeper than a second valley portion-depth DB in the radial direction with respect to the axis O from the outer peripheral end (vertex) 8c of the second finishing edge 8C to the valley bottom 9a of the second valley portion 9B. In other words, the valley bottom 9a of the first valley portion 9A is positioned on the inner peripheral side (a radially inner side) of the valley bottom 9a of the second valley portion 9B. Here, in the present embodiment, a ratio DA/DB between the first valley portion-depth DA and the second valley portion-depth DB is within a range from 1.03 to 1.15. In addition, the finishing edge-thread ridge height HB and HC of the first and second finishing edges 8B and 8C from the tangent line P passing through the valley bottoms 9a of the second and third valley portions 9B and 9C to the outer peripheral ends (vertexes) 8c along the thread ridge center line LB and LC are the same as each other.

Moreover, in this way, in the present embodiment, the first valley portion-depth DA is deeper than the second valley portion-depth DB. Accordingly, the interval in the direction of the axis O between the first valley portion center line MA which is perpendicular to the axis O and passes through the valley bottom 9a of the first valley portion 9A and the thread ridge center line LB of the first finishing edge 8B, that is, the interval WA in the direction of the axis O from the valley bottom 9a of the first valley portion 9A to the outer peripheral end (vertex) 8c of the first finishing edge 8B is larger than the interval in the direction of the axis O between the second valley portion center line MB which is perpendicular to the axis O and passes through the valley bottom 9a of the second valley portion 9B and the thread ridge center line LC of the second finishing edge 8C, that is, the interval WB in the direction of the axis O from the valley bottom 9a of the second valley portion 9B to the outer peripheral end (vertex) 8c of the second finishing edge 8C.

In addition, the inclined angle of the cutting edges 8a and 8b with respect to each of the thread ridge center lines LB and LC of the first and second finishing edges 8B and 8C and the radius of the outer peripheral end (outer peripheral cutting edge) 8c are the same as each other. Accordingly, when the second finishing edge 8C is moved toward the tip side in the direction of the axis O to be parallel to the tangent line P by the interval WD between the outer peripheral ends (vertexes) 8c of the first and second finishing edges 8B and 8C in the direction of the tangent line P, a rotation locus of the second finishing edge 8C around the axis O overlaps with (coincides with) a rotation locus of the first finishing edge 8B around the axis O, except for the first and second concave arc-shaped valley portions 9A and 9B having different depths.

Meanwhile, as described above, the preceding edge 8A is slightly smaller than an inner peripheral side root portion of the first finishing edge 8B, and thus, when the rotation locus of the preceding edge 8A around the axis O is moved to the posterior end side in the direction of the axis O to be parallel to the tangent line P passing through the valley bottoms 9a of the second and third valley portions 9B and 9C by the interval WD between the outer peripheral ends (vertexes) 8c of the first and second finishing edges 8B and 8C in the direction of the tangent line P, the rotation locus of the preceding edge 8A is included in the rotation locus of the first finishing edge 8B around the axis O.

In the screw thread cutter having the above-described configuration, the end cutting edge 7 is formed on the tip end of the cutting edge portion 3. Accordingly, as well as a case where a prepared hole is formed in a workpiece, even in a case where the prepared hole is not formed, the female screw portion is formed on an inner peripheral surface of the prepared hole by the screw thread-cutting edge 8 on the outer periphery of the cutting edge portion 3 according to the above-described helical feeding while forming the prepared hole by the end cutting edge 7. The preceding edge-thread ridge height HA of the preceding edge 8A on the tip side of the screw thread-cutting edge 8 in the direction of the axis O is lower than each of the finishing edge-thread ridge height HB and HC of the first and second finishing edges 8B and 8C arranged on the posterior end side of the preceding edge 8A in the direction of the axis O. Thus, after a valley portion of the female screw portion is roughly cut on the inner peripheral surface of the prepared hole by the preceding edge 8A, it is possible to finish-cut the remaining portion by only the first finishing edge 8B.

In addition, in the screw thread cutter having the above-described configuration, the first valley portion-depth DA from the outer peripheral end (vertex) 8c of the first finishing edge 8B to the valley bottom 9a of the first valley portion 9A is deeper than the second valley portion-depth DB from the outer peripheral end (vertex) 8c of the second finishing edge 8C to the valley bottom 9a of the second valley portion 9B. Thus, the apex of the thread ridge of the female screw portion formed on the inner peripheral surface of the prepared hole is also roughly cut to a certain height by the first valley portion 9A, and thereafter, can be finish-cut to a predetermined height by the second valley portion 9B to be formed in a predetermined screw groove shape.

Accordingly, a cutting load when the apex of the thread ridge of the female screw portion is cut can be dispersed to the first and second valley portions 9A and 9B, and for example, even in a case where thread cutting is performed on a workpiece formed of a high hardness material of HRC 50 or higher such as high speed tool steel or cold tool steel, it is possible to inhibit an excessive cutting load from being concentrated in the first valley portion 9A. Particularly, it is possible to prevent the root portion of the first finishing edge 8B from being damaged or the like. Therefore, it is possible to provide the screw thread cutter having high durability and a long life-span, and it is possible to perform stable thread cutting over a long period of time.

In addition, in the present embodiment, the ratio DA/DB between the first valley portion-depth DA and the second valley portion-depth DB is within the range from 1.03 to 1.15. Thus, the above-described effects can be reliably exerted. That is, if the ratio DA/DB falls below 1.03 and the difference between the first and second valley portion-depths DA and DB is too small, the apex of the thread ridge of the female screw portion is almost cut by the first valley portion 9A, and there is a concern that it is not possible to prevent the concentration of the cutting load. Meanwhile, conversely, if the ratio DA/DB exceeds 1.15 and the difference between the first and second valley portion-depths DA and DB is too large, the apex of the thread ridge of the female screw portion is cut by only the second valley portion 9B, the cutting load is concentrated on the second valley portion 9B, and thus, there is a concern that damage occurs in the second finishing edge 8C, or the like.

Meanwhile, in the present embodiment, the first valley portion-depth DA is deeper than the second valley portion-depth DB, and the interval WA in the direction of the axis O from the valley bottom 9a of the first valley portion 9A to the outer peripheral end (vertex) 8c of the first finishing edge 8B is larger than the interval WB in the direction of the axis O from the valley bottom 9a of the second valley portion 9B to the outer peripheral end (vertex) 8c of the second finishing edge 8C. Accordingly, for example, in order to cause the first valley portion-depth DA to be deeper than the second valley portion-depth DB in a state where the intervals WA and WB are the same as each other, it is not necessary to increase an inclination of the cutting edge 8a on the tip side of the first finishing edge 8B in the direction of the axis O with respect to the axis O. Accordingly, it is possible to largely secure a thickness of the root portion of the first finishing edge 8B in the direction of the axis O, and it is possible to reliably prevent the first finishing edge 8B from being damaged.

In addition, it is preferable that a ratio WA/WB between the interval WA in the direction of the axis O from the valley bottom 9a of the first valley portion 9A to the outer peripheral end (vertex) 8c of the first finishing edge 8B and the interval WB in the direction of the axis O from the valley bottom 9a of the second valley portion 9B to the outer peripheral end (vertex) 8c of the second finishing edge 8C is within a range of 1.01 to 1.09. That is, if the ratio WA/WB falls below 1.01 and the difference between the intervals WA and WB is too small, the apex of the thread ridge of the female screw portion formed in the workpiece is almost cut by the first valley portion 9A, and there is a concern that it is not possible to prevent the concentration of the cutting load. If the ratio WA/WB exceeds 1.09 and the difference between the intervals WA and WB is too large, the apex of the thread ridge of the female screw portion is cut by only the second valley portion 9B, the cutting load is concentrated on the second valley portion 9B, and thus, there is a concern that damage occurs in the second finishing edge 8C or the like.

In addition, in the present embodiment, the interval WA in the direction of the axis O from the valley bottom 9a of the first valley portion 9A to the outer peripheral end (vertex) 8c of the first finishing edge 8B is larger than the interval WB in the direction of the axis O from the valley bottom 9a of the second valley portion 9B to the outer peripheral end (vertex) 8c of the second finishing edge 8C. Further, when the second finishing edge 8C is moved toward the tip side in the direction of the axis O to be parallel to the tangent line P by the interval WD between the outer peripheral ends (vertexes) 8c of the first and second finishing edges 8B and 8C in the direction of the tangent line P, the rotation locus of the second finishing edge 8C around the axis O overlaps with the rotation locus of the first finishing edge 8B around the axis O, except for the first and second valley portions 9A and 9B having different depths.

Accordingly, unlike a case where an inclination of the cutting edge 8a on the tip side of the first finishing edge 8B in the direction of the axis O with respect to the axis O increases, the cutting edge 8a of the second finishing edge 8C facing the tip side in the direction of the axis O is not used for the cutting before the cutting edge 8a of the first finishing edge 8B is abraded. Accordingly, except for the second valley portion 9B, even when the first finishing edge 8B is abraded, the thread cutting can be continued by the second finishing edge 8C to form the female screw portion having a predetermined screw groove shape, and thus, it is possible to provide the screw thread cutter having a longer life-span.

In addition, in the present embodiment, when the rotation locus of the preceding edge 8A is moved to the posterior end side in the direction of the axis O to be parallel to the tangent line P passing through the valley bottoms 9a of the second and third valley portions 9B and 9C by the interval WD between the outer peripheral ends (vertexes) 8c of the first and second finishing edges 8B and 8C in the direction of the tangent line P, the rotation locus of the preceding edge 8A around the axis O is formed to be included in the rotation locus of the first finishing edge 8B around the axis O. Accordingly, as described above, even when the cutting edge portion 3 of the tip portion of the cutter body 1 is deflected by an excessive cutting load and the thread cutting surface of the female screw portion is damaged by the preceding edge 8A, this can be reliably removed by the first finishing edge 8B, it is possible to prevent scratches from remaining on the finished surface and to form the thread cutting surface having high quality.

Particularly, in the present embodiment, as described above, when the rotation locus of the preceding edge 8A is moved, the cutting edges 8a and 8b of the preceding edge 8A are formed to be positioned inside the rotation loci of the cutting edges 8a and 8b of the first finishing edge 8B. Accordingly, regardless of which direction the cutting edge portion 3 deflects with respect to the axis O, the scratches left by the preceding edge 8A can be removed by the first finishing edge 8B with a certain margin. Thus, it is possible to form the female screw portion having a high quality thread cutting surface in the workpiece.

In addition, in the present embodiment, as described above, the first and second valley portions 9A and 9B and the outer peripheral ends (apexes, outer peripheral cutting edges) 8c of the first and second finishing edges 8B and 8C are formed in concave and convex arc shapes having approximately the same radius. However, a curvature radius of the concave arc formed by the valley bottoms 9a of the first and second valley portions 9A and 9B is formed to be slightly larger than a curvature radius of the convex arc formed by the outer peripheral ends (outer peripheral cutting edges) 8c of the first and second finishing edges 8B and 8C. In addition, the outer peripheral ends (outer peripheral cutting edges) 8c of the first and second finishing edges 8B and 8C or the valley bottoms 9a of the first, second, and third valley portions 9A, 9B, and 9C may be formed in straight lines parallel to the axis O so as to form a trapezoidal screw in the workpiece or may be chamfered to include two or more straight lines.

Moreover, in the present embodiment, the end cutting edge 7 is formed on the tip end of the cutting edge portion 3. However, for example, in a case where the thread cutting is performed on the workpiece in which the prepared hole is formed in advance, the end cutting edge 7 may not be formed. In addition, in the present embodiment, the third valley portion 9C is formed in an approximately quarter-concave arc shape and only the first and second two finishing edges 8B and 8C are formed so as to be arranged in the direction of the axis O. However, the third valley portion 9C may be formed in an approximately half-concave arc shape, and a third finishing edge may be formed on the posterior end side of the third valley portion 9C in the direction of the axis O such that three or more finishing edges are formed to be arranged. In this case, the depth of the first valley portion between the preceding edge 8A and the first finishing edge 8B and the depths of the valley portions formed between the three or more finishing edges may be sequentially deeper toward the tip side in the direction of the axis O.

Second Embodiment

Next, a screw thread cutter according to a second embodiment of the present invention will be described with reference to FIG. 5. In the screw thread cutter of the present embodiment, the first and second finishing edges are different from those of the first embodiment. In addition, the same reference numerals are assigned to portions common to the first embodiment, and descriptions thereof are simplified. In addition, in the portions indicated by different reference numerals, descriptions with respect to portions having the same names as those of the first embodiment and configurations and effects similar to those of the first embodiment are omitted.

Figure 5:
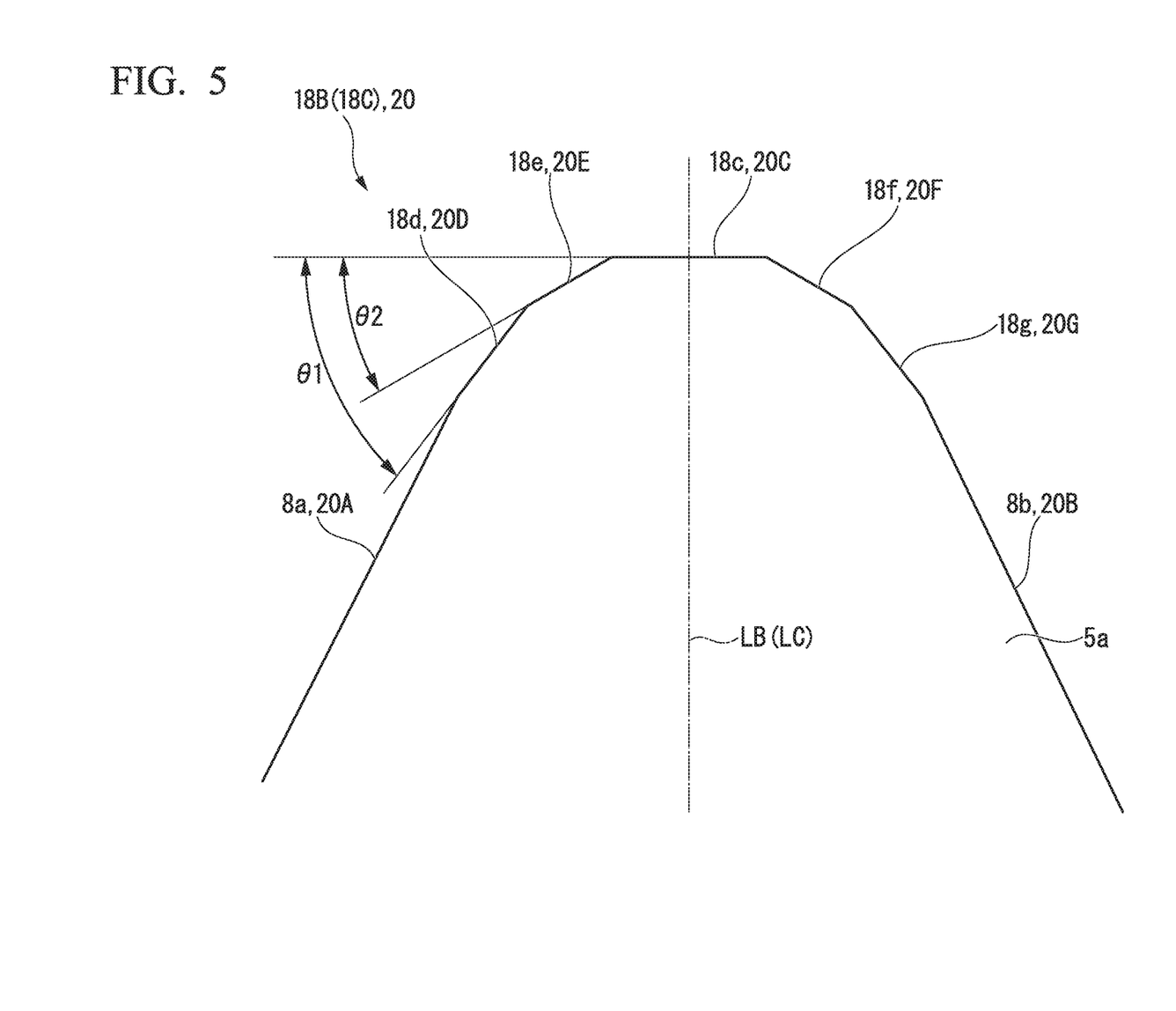
FIG. 5 is a partially enlarged side view of a finishing edge showing a second embodiment of the present invention.

FIG. 5 is a partially enlarged side view of a finishing edge of a screw thread cutter of the present embodiment. In the present embodiment, when the second finishing edge 18C is moved toward the tip side in the direction of the axis O to be parallel to the tangent line P by the interval WD between the outer peripheral ends (vertexes) of the first and second finishing edges 18B and 18C in the direction of the tangent line P passing through the valley bottoms 9a of the second and third valley portions 9B and 9C, the rotation locus of the second finishing edge 8C around the axis O overlaps with (coincides with) the rotation locus of the first finishing edge 8B around the axis O, except for the first and second valley portions 9A and 9B having different depths. That is, the configurations of the first and second finishing edges 18B and 18C are approximately the same as each other, and thus, in the present embodiment, the configuration of the finishing edge is described with the first finishing edge 18B as an example, and descriptions of the second finishing edge 18C are omitted.

The first finishing edge 18B of the present embodiment includes the cutting edge 8a facing the tip side in the direction of the axis O, the cutting edge 8b facing the posterior end side in the axial direction, and a straight line-shaped outer peripheral cutting edge 18c. The outer peripheral cutting edge 18c is parallel to the axis O. The outer peripheral cutting edge 18c and the cutting edge 8a facing the tip side in the direction of the axis O are connected to each other via a plurality of linear cutting edges. The outer peripheral cutting edge 18c and the cutting edge 8b facing the posterior end side in the axial direction are connected to each other via a plurality of linear cutting edges. In the present embodiment, the outer peripheral cutting edge 18c and the cutting edge 8a are connected to each other via two linear cutting edges 18d and 18e. In the present embodiment, the outer peripheral cutting edge 18c and the cutting edge 8b are connected to each other via two linear cutting edges 18f and 18g. In addition, the first finishing edge 18B is linearly symmetrical with respect to the thread ridge center line LB.

More specifically, in the thread ridge 20 continuous to the side opposite to the cutter rotation direction T of the first finishing edge 18B, a surface 20A facing the tip side in the direction of the axis O, a first chamfered surface 20D, a second chamfered surface 20E, a top surface 20C, a second chamfered surface 20F, a first chamfered surface 20G, and a surface 20B facing the posterior end side in the direction of the axis O are formed in this order from the tip side in the direction of the axis O. These intersect the wall surface 5a of the chip discharge groove 5 facing the cutter rotation direction T, and intersection ridgeline portions thereof are referred to as a cutting edge 8a, a linear cutting edge 18d, a linear cutting edge 18e, an outer peripheral cutting edge 18c, a linear cutting edge 18f, a linear cutting edge 18g, and a cutting edge 8b. All the surfaces are approximately flat surfaces extending in the circumferential direction between two chip discharge grooves 5 (the outer peripheral portion 3b of the cutting edge portion 3) adjacent to each other in the circumferential direction. In this way, in the first finishing edge 18B (second finishing edge 18C) of the present embodiment, the first and second chamfered surfaces 20D and 20E serving as the chamfered surfaces are provided between the top surface 20C forming the outer peripheral cutting edge 18c and the surface 20A forming the cutting edge 8a. In addition, the first and second chamfered surfaces 20G and 20F serving as the chamfered surfaces are provided between the top surface 20C forming the outer peripheral cutting edge 18c and the surface 20B forming the cutting edge 8b.

An angle (an angle between the linear cutting edge 18d (18g) and the outer peripheral cutting edge 18c) θ1 between the first chamfered surface 20D (20G) and the top surface 20C and an angle (an angle between the linear cutting edge 18e (18f) and the outer peripheral cutting edge 18c) θ2 between the second chamfered surface 20E (20F) and the top surface 20C are different from each other. The first chamfered surface 20D is formed to be farther apart from the top surface 20C than the second chamfered surface 20E in the direction of the axis O. Thus, the angle θ1 between the first chamfered surface 20D and the top surface 20C is larger than the angle θ2 between the second chamfered surface 20E and the top surface 20C.

As described above, each of the first and second finishing edges 18B and 18C of the present embodiment includes the two chamfered surfaces 20D and 20E between the top surface 20C forming the outer peripheral cutting edge 18c and the surface 20A forming the cutting edge 8a, and includes the two chamfered surfaces 20F and 20G between the top surface 20C forming the outer peripheral cutting edge 18c and the surface 20B forming the cutting edge 8b. Accordingly, for example, like a pipe female screw, in a case where a female screw having an apex of a thread ridge and a corner of the valley portion which are curved is machined, by helically feeding the screw thread cutter of the present embodiment relative to the workpiece, the loci of the cutting edges of the first and second finishing edges 18B and 18C draw continuous curves. As a result, it is possible to form a machined surface equivalent to a case where the cutting is performed by the finishing edge formed in a curve (the finishing edge which is formed in a curved surface and is formed in the intersection ridgeline portion between the thread ridge and the wall surface 5a of the chip discharge groove 5 facing the cutter rotation direction T). Meanwhile, in a case where only one chamfered surface is formed between the top surface 20C and the surface 20A and the top surface 20C and the surface 20B, each of the angle between the top surface 20C forming the outer peripheral cutting edge 18c and the chamfered surface, the angle between the surface 20A forming the cutting edge 8a and the chamfered surface, and the angle between the surface 20B forming the cutting edge 8b and the chamfered surface does not become sufficiently small, and thus, a corner is formed. Accordingly, even if the screw thread cutter having the finishing edge is helically fed relative to the workpiece, the locus of the cutting edge of the finishing edge does not draw a continuous curve, and thus, it is difficult to accurately machine the curved surface.

In addition, in a case where a screw thread cutter having a convexly curved thread ridge (curved finishing edge) is manufactured as a screw thread cutter for machining a ridge portion and a valley portion of a female thread into a curved surface, it is necessary to machine the finishing edge using an integrated grinding wheel having a concave curved surface corresponding to the convex curved shape of the finishing edge. In this case, if the convex curved surface is ground using the integrated grinding wheel, uneven wear tends to occur, a grinding wheel life-span is extremely shortened, and thus, manufacturability and economic efficiency deteriorate. In the present embodiment, two chamfered surfaces are provided in each of the portion between the top surface 20C and the surface 20A and the portion between the top surface 20C and the surface 20B, and thus, it is possible to form the thread ridge and the finishing edge of this embodiment only by chamfering by grinding without the integrated grinding wheel. Therefore, manufacturability and economic efficiency are excellent. In addition, as described above, according to the screw thread cutter of the present embodiment, it is possible to form the machined surface equivalent to the case where the cutting is performed by the finishing edge formed in a curved surface. Thus, according to the screw thread cutter of the present embodiment, it is possible to achieve both a function and manufacturability.

In addition, the present invention is not limited to the above-described embodiments, and additions, omissions, substitutions, and other modification of configurations can be made without departing from the spirit of the present invention. Moreover, the present invention is not limited by the embodiments described above, and is limited only by the claims.

INDUSTRIAL APPLICABILITY

According to the screw thread cutter of the present invention, even in a case where the thread cutting is performed on a high hardness material, it is possible to prevent the finishing edge from being damaged, and thus, it is possible to stably perform the thread cutting over a long period of time.

REFERENCE SIGNS LIST

1: cutter body
2: shank portion
3: cutting edge portion
3a: inner peripheral portion of tip surface of cutting edge portion 3
3b: outer peripheral portion of cutting edge portion 3
4: neck portion
5: chip discharge groove
5a: wall surface of chip discharge groove 5 facing cutter rotation direction T
6: groove
7: end cutting edge
8: screw thread-cutting edge
8A: preceding edge
8B: first finishing edge
8C: second finishing edge
8a: cutting edge of screw thread-cutting edge 8 facing tip side in direction of axis O
8b: cutting edge of screw thread-cutting edge 8 facing posterior end side in direction of axis O
8c: outer peripheral end of first and second finishing edge 8B, 8C
8d: outer peripheral cutting edge of preceding edge 8A
9A: first valley portion
9B: second valley portion
9C: third valley portion
9a: valley bottom of first and second third valley portion 9A, 9B, 9C
18c: outer peripheral cutting edge
18d, 18e, 18f, 18g: linear cutting edge
20: thread ridge
20A: surface of thread ridge 20 facing tip side in direction of axis O
20B: surface of thread ridge 20 facing posterior end side in direction of axis O
20C: top surface
20D: first chamfered surface
20E: second chamfered surface
20F: second chamfered surface
20G: first chamfered surface
O: axis of cutter body 1
T: cutter rotation direction
P: tangent line passing through valley bottom 9a of second and third valley portion 9B, 9C
Q: straight line passing through outer peripheral end 8c of first finishing edge 8B and outer peripheral end 8c of second finishing edge 8C
LA: thread ridge center line of preceding edge 8A
LB: thread ridge center line of first finishing edge 8B
LC: thread ridge center line of second finishing edge 8C
MA: first valley portion center line
MB: second valley portion center line
HA: preceding edge-thread ridge height
HB: finishing edge-thread ridge height of first finishing edge 8B
HC: finishing edge-thread ridge height of second finishing edge 8C
DA: first valley portion-depth
DB: second valley portion-depth
WA: interval in direction of axis O from valley bottom 9a of first valley portion 9A to outer peripheral end (vertex) 8c of first finishing edge 8B
WB: interval in direction of axis O from valley bottom 9a of second valley portion 9B to outer peripheral end (vertex) 8c of second finishing edge 8C
WC: width of outer peripheral cutting edge 8d in direction of axis O
WD: interval of outer peripheral end (vertex) 8c of first and second finishing edges 8B and 8C in direction of tangent line P
WE: width of first finishing edge 8B in direction of axis O at radial position of outer peripheral cutting edge 8d of preceding edge 8A

What is claimed is:

1. A screw thread cutter comprising,
a cutter body which is rotated around an axis,
a cutting edge portion which is formed on a tip portion of the cutter body,
an end cutting edge which is formed on a tip surface of the cutting edge portion, and
at least three screw thread-cutting edges which are formed on an outer circumference of the cutting edge portion, and configured to be helically fed relative to a workpiece to form a screw portion workpiece,
wherein at least three screw thread-cutting edges protrudes toward an outer peripheral side of the cutter body, and formed to be arranged in an axial direction,
wherein among the at least three screw thread-cutting edges, the screw thread-cutting edge positioned on a tip side in the axial direction is a preceding edge, a portion of which intersects with the end cutting edge,
wherein among the at least three screw thread-cutting edges, the screw thread-cutting edge positioned on a posterior end side in the axial direction with respect to the preceding edge is a first finishing edge,
wherein among the at least three screw thread-cutting edges, the screw thread-cutting edge positioned on a posterior end side in the axial direction with respect to the first finishing edge is a second finishing edge,
wherein a first valley portion which is recessed toward an inner peripheral side of the cutter body is formed between the preceding edge and the first finishing edge, wherein a second valley portion which is recessed toward the inner peripheral side of the cutter body is formed between the first finishing edge and the second finishing edge, wherein a third valley portion which is recessed toward the inner peripheral side of the cutter body is formed on a posterior end side in the axial direction with respect to of the second finishing edge, wherein finishing edge-thread ridge heights in a radial direction with respect to the axis from a tangent line passing through valley bottoms of the second and third valley portions to outer peripheral ends of the first and second finishing edges are equal to each other, wherein a preceding edge-thread ridge height in the radial direction with respect to the axis from the tangent line passing through the valley bottoms of the second and third valley portions to an outer peripheral end of the preceding edge is lower than the finishing edge-thread ridge heights, wherein a first valley portion-depth in the radial direction with respect to the axis from the outer peripheral end of the first finishing edge to the valley bottom of the first valley portion is deeper than a second valley portion-depth in the radial direction with respect to the axis from the outer peripheral end of the second finishing edge to the valley bottom of the second valley portion, and wherein an interval in the axial direction from the valley bottom of the first valley portion to the outer peripheral end of the first finishing edge is larger than an interval in the axial direction from the valley bottom of the second valley portion to the outer peripheral end of the second finishing edge.

2. The screw thread cutter according to claim 1, wherein a ratio between the first valley portion-depth and the second valley portion-depth is within a range of 1.03 to 1.15.

3. The screw thread cutter according to claim 2, wherein when the second finishing edge is moved parallel to the tangent line toward the tip side in the axial direction by an interval between the outer peripheral end of the first finishing edge and the outer peripheral end of the second finishing edges in a direction of the tangent line passing through the valley bottoms of the second and third valley portions, a rotation locus of the second finishing edge around the axis overlaps with a rotation locus of the first finishing edge around the axis except for the first and second valley portions.

4. The screw thread cutter according to claim 1, wherein when the second finishing edge is moved parallel to the tangent line toward the tip side in the axial direction by an interval between the outer peripheral end of the first finishing edge and the outer peripheral end of the second finishing edges in a direction of the tangent line passing through the valley bottoms of the second and third valley portions, a rotation locus of the second finishing edge around the axis overlaps with a rotation locus of the first finishing edge around the axis except for the first and second valley portions.

5. The screw thread cutter according claim 1, wherein when a rotation locus of the preceding edge around the axis is moved toward the posterior end side in the axial direction to be parallel to the tangent line passing through the valley bottoms of the second and third valley portions by an interval between the outer peripheral end of the first finishing edge and the outer peripheral end of the second finishing edges in a direction of the tangent line, the rotation locus of the preceding edge is included in a rotation locus of the first finishing edge around the axis.

6. The screw thread cutter according to claim 1, wherein each of the first and second finishing edges includes a cutting edge facing the tip side in the axial direction, a cutting edge facing the posterior end side in the axial direction, and a linear outer peripheral cutting edge, and wherein in each of the first and second finishing edges, the outer peripheral cutting edge and the cutting edge facing the tip side in the axial direction are connected to each other via a plurality of linear cutting edges, and the cutting edge facing the posterior end side in the axial direction and the outer peripheral cutting edge are connected to each other via a plurality of linear cutting edges.

7. The screw thread cutter according to claim 1, wherein a ratio between the interval in the axial direction from the valley bottom of the first valley portion to the outer peripheral end of the first finishing edge and the interval in the axial direction from the valley bottom of the second valley portion to the outer peripheral end of the second finishing edge is within a range of 1.01 to 1.09.

8. The screw thread cutter according to claim 1, wherein the outer peripheral end of the second finishing edge is positioned outside the outer peripheral end of the first finishing edge in the radial direction with respect to the axis.

9. The screw thread cutter according to claim 1, wherein an outer peripheral cutting edge of each of the first and second finishing edges has a convex arc shape.

10. The screw thread cutter according to claim 1, wherein each of the first and second valley portions has a concave arc shape.

11. A screw thread cutter comprising,
a cutter body which is rotated around an axis,
a cutting edge portion which is formed on a tip portion of the cutter body,
an end cutting edge which is formed on a tip surface of the cutting edge portion, and
at least three screw thread-cutting edges which are formed on an outer circumference of the cutting edge portion, and configured to be helically fed relative to a workpiece to form a screw portion the workpiece, wherein at least three screw thread-cutting edges protrudes toward an outer peripheral side of the cutter body, and formed to be arranged in an axial direction, wherein among the at least three screw thread-cutting edges, the screw thread-cutting edge positioned on a tip side in the axial direction is a preceding edge, a portion of which intersects with the end cutting edge, wherein among the at least three screw thread-cutting edges, the screw thread-cutting edge positioned on a posterior end side in the axial direction with respect to the preceding edge is a first finishing edge, wherein among the at least three screw thread-cutting edges, the screw thread-cutting edge positioned on a posterior end side in the axial direction with respect to the first finishing edge is a second finishing edge, wherein a first valley portion which is recessed toward an inner peripheral side of the cutter body is formed between the preceding edge and the first finishing edge, wherein a second valley portion which is recessed toward the inner peripheral side of the cutter body is formed between the first finishing edge and the second finishing edge, wherein a third valley portion which is recessed toward the inner peripheral side of the cutter body is formed on a posterior end side in the axial direction with respect to the second finishing edge, wherein an outer peripheral end of the second finishing edge is positioned outside an outer peripheral end of the first finishing edge in a radial direction with respect to the axis, wherein a preceding edge-thread ridge height in the radial direction with respect to the axis from a tangent line passing through valley bottoms of the second and third valley portions to an outer peripheral end of the preceding edge is lower than finishing edge-thread ridge heights in the radial direction from the tangent line to the outer peripheral ends of the first and second finishing edges, wherein a first valley portion-depth in the radial direction with respect to the axis from the outer peripheral end of the first finishing edge to the valley bottom of the first valley portion is deeper than a second valley portion-depth in the radial direction with respect to the axis from the outer peripheral end of the second finishing edge to the valley bottom of the second valley portion, and wherein an interval in the axial direction from the valley bottom of the first valley portion to the outer peripheral end of the first finishing edge is larger than an interval in the axial direction from the valley bottom of the second valley portion to the outer peripheral end of the second finishing edge.

12. The screw thread cutter according to claim 2, wherein a ratio between the first valley portion-depth and the second valley portion-depth is within a range of 1.03 to 1.15.

13. The screw thread cutter according to claim 11, wherein when the second finishing edge is moved parallel to the tangent line toward the tip side in the axial direction by an interval between the outer peripheral end of the first finishing edge and the outer peripheral end of the second finishing edges in a direction of the tangent line passing through the valley bottoms of the second and third valley portions, a rotation locus of the second finishing edge around the axis overlaps with a rotation locus of the first finishing edge around the axis except for the first and second valley portions.

14. The screw thread cutter according claim 11, wherein when a rotation locus of the preceding edge around the axis is moved toward the posterior end side in the axial direction to be parallel to the tangent line passing through the valley bottoms of the second and third valley portions by an interval between the outer peripheral end of the first finishing edge and the outer peripheral end of the second finishing edges in a direction of the tangent line, the rotation locus of the preceding edge is included in a rotation locus of the first finishing edge around the axis.

15. The screw thread cutter according to claim 11, wherein each of the first and second finishing edges includes a cutting edge facing the tip side in the axial direction, a cutting edge facing the posterior end side in the axial direction, and a linear outer peripheral cutting edge, and wherein in each of the first and second finishing edges, the outer peripheral cutting edge and the cutting edge facing the tip side in the axial direction are connected to each other via a plurality of linear cutting edges, and the cutting edge facing the posterior end side in the axial direction and the outer peripheral cutting edge are connected to each other via a plurality of linear cutting edges.

16. The screw thread cutter according to claim 11, wherein an outer peripheral cutting edge of each of the first and second finishing edges has a convex arc shape.

17. The screw thread cutter according to claim 11, wherein each of the first and second valley portions has a concave arc shape.

* * * * *